(12) United States Patent
Malinas et al.

(10) Patent No.: US 10,467,474 B1
(45) Date of Patent: Nov. 5, 2019

(54) VEHICLE TRACK DETECTION IN SYNTHETIC APERTURE RADAR IMAGERY

(71) Applicant: National Technology & Engineering Solutions of Sandia, LLC, Albuquerque, MN (US)

(72) Inventors: Rebecca Malinas, Northville, MI (US); Tu-Thach Quach, Albuquerque, MN (US); Mark W. Koch, Albuquerque, MN (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 638 days.

(21) Appl. No.: 15/207,290

(22) Filed: Jul. 11, 2016

(51) Int. Cl.
*G06K 9/00* (2006.01)
*G06K 9/62* (2006.01)
*G06K 9/46* (2006.01)
*G01S 13/90* (2006.01)

(52) U.S. Cl.
CPC ........ *G06K 9/00651* (2013.01); *G01S 13/904* (2019.05); *G06K 9/4642* (2013.01); *G06K 9/623* (2013.01); *G06K 9/6232* (2013.01); *G06K 2009/4666* (2013.01)

(58) Field of Classification Search
CPC .................................................. G06K 9/00651
USPC ........................................................ 342/25 F
See application file for complete search history.

(56) References Cited

U.S. PATENT DOCUMENTS

| 5,995,580 | A | * | 11/1999 | Schaller | G06T 11/006 |
| | | | | | 378/15 |
| 6,665,449 | B1 | * | 12/2003 | He | G06K 9/4633 |
| | | | | | 382/162 |
| 10,032,077 | B1 | * | 7/2018 | Chow | G06T 11/001 |
| 2002/0028019 | A1 | * | 3/2002 | Hemiari | G06K 9/4604 |
| | | | | | 382/190 |

(Continued)

FOREIGN PATENT DOCUMENTS

EP          0314521 A2 *  5/1989  ............. G01N 21/88

OTHER PUBLICATIONS

Malinas, Rebecca, et al, Vehicle Track Detection in CCD Imagery Via Conditional Random Field, Institute of Electrical and Electronic Engineers (IEEE), Nov. 11, 2015, p. 1-6, (Year: 2015).*

(Continued)

*Primary Examiner* — Marcus E Windrich
(74) *Attorney, Agent, or Firm* — Medley, Behrens & Lewis, LLC (57) ABSTRACT

The various technologies presented herein relate to detecting one or more vehicle tracks in radar imagery. A CCD image can be generated from a first SAR image and a second SAR image captured for a common scene, wherein the second SAR image may include a vehicle track that is not present in the first SAR image. A Radon transform (RT) process can be applied to each pixel in the CCD image, and further, a radial derivative (RDRT) can be determined for each pixel from RT values derived for each pixel. Each pixel can be labelled as being related to a track, or not, based upon a unary cost obtained from the RDRT value of that pixel, combined with a probability of the pixel label based upon labels applied to neighboring pixels. A labelled representation of the CCD image can be generated based upon the determination of "track" or "not track".

18 Claims, 6 Drawing Sheets

(56) References Cited

U.S. PATENT DOCUMENTS

| | | | |
|---|---|---|---|
| 2002/0120391 A1* | 8/2002 | Nehls, III | G01S 7/22 |
| | | | 701/120 |
| 2003/0142778 A1* | 7/2003 | Proksa | A61B 6/032 |
| | | | 378/4 |
| 2003/0182246 A1* | 9/2003 | Johnson | G06N 7/08 |
| | | | 705/76 |
| 2005/0031191 A1* | 2/2005 | Venkatachalam | G06K 9/4633 |
| | | | 382/152 |
| 2011/0299733 A1* | 12/2011 | Jahangir | G01S 13/9023 |
| | | | 382/103 |
| 2015/0206025 A1* | 7/2015 | Chen | G06T 5/00 |
| | | | 382/202 |
| 2016/0379053 A1* | 12/2016 | Chen | G06K 9/00637 |
| | | | 382/103 |
| 2018/0357745 A1* | 12/2018 | Pattichis | G06F 9/3001 |

OTHER PUBLICATIONS

Quach, Tu-Thach, et. al., A Model-Based Approach to Finding Tracks in SAR CCD Images, Institute of Electrical and Electronic Engineers (IEEE), Jun. 12, 2015, p. 1-7 (Year: 2015).*

Cooke, Tristrom, Detection and Classification of Objects in Synthetic Aperture Radar Imagery, Intelligence, Surveillance and Reconnaissance Division, Defense Science and Technology Organization, Feb. 2006, Sections 1-2 (Year: 2006).*

Cooke, Tristrom, Detection and Classification of Objects in Synthetic Aperture Radar Imagery, Itelligence, Surveillance and Reconnaissance Division, Defense Science and Technology Organization, Feb. 2006, Sections 1-2 (Year: 2004).*

Boykov, et al., "Fast Approximate Energy Minimization Via Graph Cuts", In IEEE Transactions on Pattern Analysis and Machine Intelligence, 2001, pp. 1-41.

Boykov, et al., "An Experimental Comparison of Min-Cut/Max-Flow Algorithms for Energy Minimization in Vision", In IEEE Transactions on Pattern Analysis and Machine Intelligence, vol. 26, No. 9, Sep. 2004, pp. 1124-1137.

Cha, et al., "Automatic Track Tracing in SAR CCD Images Using Search Cues", In 2012 Conference Record of the Forth Sixth Asilomer Conference on Signals, Systems and Computers, 2012, pp. 1825-1829.

Cha, et al., "Finding Curves in SAR CCD Images", In IEEE International Conference on Acoustics, 2011, pp. 2024-2027.

Cooke, Tristrom, "Detection and Classification of Objects in Synthetic Aperture Radar Imagery", In No. DSTO-RR-305, Feb. 2006, 206 pages.

Jakowatz, et al, "Spotlight Mode Synthetic Aperture Radar: A Signal Processing Approach", In Springer Science and Business Media, 2012, 439 pages.

Kolmogorov, et al., "What Energy Functions Can Be Minimized Via Graph Cuts?", In IEEE Transactions on Pattern Analysis and Machine Intelligence, vol. 26, No. 2, Feb. 2004, pp. 147-159.

Prince, Simon J.D., "Computer Vision: Models, Learning and Inference", Jul. 7, 2012, 667 pages.

* cited by examiner

VEHICLE TRACK DETECTION IN SYNTHETIC APERTURE RADAR IMAGERY

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

Vehicle track detection in synthetic aperture radar coherent change detection (SAR CCD) imagery has application in surveillance and search and rescue. CCD can detect subtle scene changes such as vehicle tracks (e.g., human activity); however, automatic detection of vehicle tracks in SAR CCD is difficult due to areas of low coherence caused by various phenomena other than true change, such as vegetation and the CCD image formation process. Conventional techniques for vehicle track detection in SAR CCD require user cues for identification of roads or other indicators for possible vehicle activity, or explicit modeling of vehicle tracks as parallel low coherence areas. This knowledge can be incorporated into a template that is used to detect candidate vehicle track points, followed by a curve-fitting step to link points. The parallel template causes difficulty in detecting single tracks. These methods may also involve a pre-processing smoothing or thresholding step to mitigate false alarms caused by the non-change phenomena described previously and some can only find one track in an image.

SUMMARY

The following is a brief summary of subject matter that is described in greater detail herein. This summary is not intended to be limiting as to the scope of the claims.

Various technologies presented herein relate to automatically detecting one or more vehicle tracks in a coherent change detection (CCD) image. Automated detection of a vehicle track (e.g., generated by a motorcycle, a car) can be quickly presented to an operator (e.g., a radar image analyst) which can further expedite intelligence gathering and/or response regarding a situation present in the CCD image.

In an embodiment, a CCD image can be created from two synthetic aperture radar (SAR) images, wherein a first SAR image is captured for a scene at a first instant in time, and a second SAR image can be captured of the scene at a later instant in time. However, other spurious signals may also be present in a SAR image which can complicate detection of a vehicle track, such as other sources of radar energy and/or noise. Such other sources can include temporal decorrelations resulting from weather related phenomena (e.g., wind, rain), plant movement, etc., that have occurred in a scene between radar image collections, as well as SAR speckle, shadow-related effects, etc.

In an embodiment, respective pixels in a CCD image are labelled as being identified as being a vehicle track pixel, while other pixels in the CCD image are labelled as not being pixels corresponding to a vehicle track. Pixels can be respectively labelled based upon a combination of unary cost of labelling the pixel as "yes, it is a vehicle track pixel", and a pairwise cost, wherein the labelling of the pixel is performed based upon a label applied to one or more pixels that are adjacent (neighboring) to the pixel of interest.

To facilitate determination of a unary cost for each pixel in the CCD image, a Radon transform can be applied to signal magnitudes over a window centered on the pixel of interest. In an embodiment, generation of a vehicle track, e.g., by a tire interacting with a surface, results in disturbance of the surface, wherein the disturbance may be in the second SAR image but not in the first SAR image. Hence, when the CCD image is generated, the pixels in the CCD image relating to the vehicle track can be identified owing to their respective signal magnitude. However, the aforementioned spurious signals present in the CCD image can also have a high magnitude, and thus complicate identification of pixels relating to vehicle tracks in the CCD image. The Radon transform (RT) determined for each pixel can be further processed to facilitate determination of a radial (along r) derivative (RDRT) of the local Radon transform centered at the pixel in a polar coordinate (r, $\theta$). The unary cost determination can be based upon the determined RDRT. In an embodiment, for a thin track (e.g., a vehicle track), at a given $\theta$, the radial derivative of the RT can have large values at r that coincide with track edges. However, radar clutter in the CCD image can have a range of r with similar RT values, which generally results in low derivatives for the RT. While there may be high derivative values at edges of clutter regions, the magnitude of the derivatives at clutter edges are generally lower than that of track edges, hence, the RDRT process is able to distinguish tracks from background clutter, advantage of which can be taken during the pixel labelling operation.

In an embodiment, the respective determinations of RT values and RDRT values can be obtained by applying a window at a pixel of interest, e.g., centered on the pixel. The window can be l-pixels by h-pixels (where l and h can be substantially any integers greater than 2), and centered on the pixel of interest. The pixels in the window can be quantified, e.g., a highest magnitude value for all the pixels in the window can be determined, and the value applied to the pixel. The process can be repeated for each pixel in the CCD image.

The pairwise cost can be determined based upon applying a label to a pixel in view of labels applied to neighboring pixels.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to detecting vehicle tracks in radar imagery, are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. The terms "component" and "system" are also intended to encompass hardware configured to cause certain functionality to be performed, where such hardware can include, but is not limited to including, Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Further, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

As previously mentioned, it can be difficult to detect one or more vehicle tracks in coherent change detection (CCD) imagery owing to difficulties involved in distinguishing a track from other sources of change and/or noise. Such other sources can include temporal decorrelations resulting from weather related phenomena (e.g., wind, rain), plant movement, etc., that have occurred in a scene between radar image collections, as well as SAR speckle, shadow-related effects, etc.

The various embodiments presented herein relate to pixel-level labeling (e.g., binary labelling: "track" or "non-track") of coherent change detection (CCD) images based on a conditional random field. No assumptions about vehicle track characteristics are made, other than a general assumption that vehicle-made tracks (manmade tracks) are long and thin in comparison to typical CCD background clutter. Further, no user input and no pre-processing steps are required during the identification process, other than a training phase to establish a unary cost of a conditional random field (as further described). In an aspect, since parallel vehicle tracks are not explicitly modelled, the various embodiments presented herein are applicable to detecting other change phenomena, such as ground surface disturbances. In an embodiment, the unary cost is derived from radial derivatives of local Radon transforms centered on each pixel to be labeled. Per the various embodiments presented herein, it is possible to successfully detect both parallel and single tracks in synthetic aperture radar (SAR) CCD imagery and it is also possible to correctly label pixels in clutter areas as non-track when no tracks are present in the SAR images.

Figure 1:
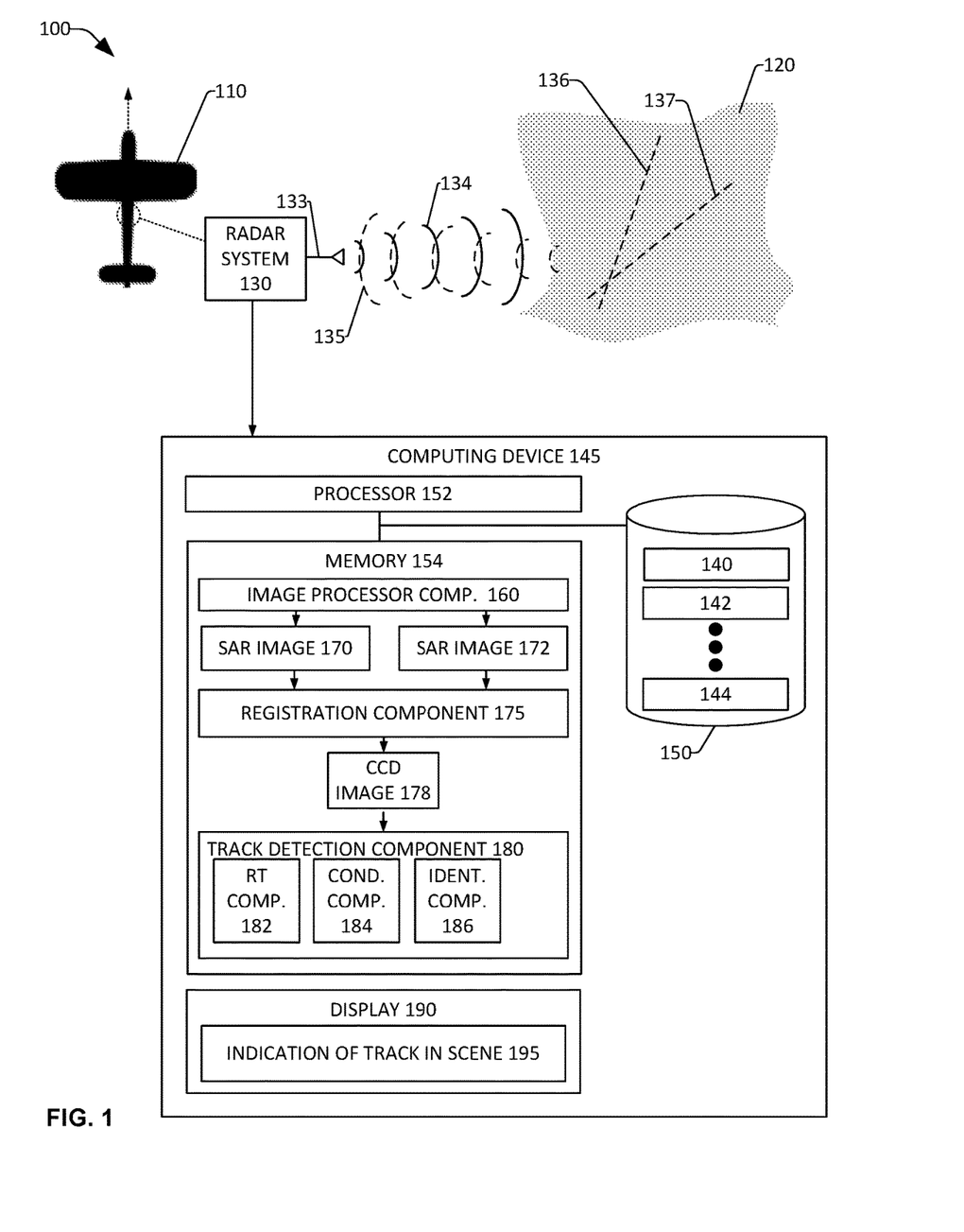
FIG. 1 illustrates a system for detecting a vehicle track in a scene, according to an embodiment.

FIG. 1 illustrates a system 100, whereby the system 100 can be a radar system configured to compare information in two or more radar images (e.g., two SAR images) to identify constituents of a scene (e.g., a terrain) captured in the two radar images, whereby the constituents can be vehicle tracks (herein after "tracks"), small targets, large objects, manmade structures, naturally occurring features, etc.

FIG. 1 depicts an aircraft 110 (an airplane, an orbiting satellite, a drone, etc.) flying over a scene 120. The aircraft 110 has located thereon a radar system 130 that comprises an antenna 133. The antenna 133 is configured to transmit radar signals 134 (pulses, chirps, etc.) and receive radar echoes 135, which have been generated by reflection of the radar signals 134 from the scene 120. The radar system 130 can include a controller (not shown), which is configured to control transmission of the signals 134, wherein the controller can be or be included in a digital signal processor, an application-specific integrated circuit (ASIC), or the like. Scene 120 can include a plurality of features and/or objects, during a second pass of the aircraft 110 over the scene 120 the scene includes one or more tracks 136 and 137 which were not present during a first (initial) pass of the aircraft 110 over the scene 120. The various embodiments presented herein facilitate the detection of the presence of the tracks 136 and 137 in radar data collected during the second pass relative to the first pass. In an embodiment, the tracks can be generated by the same vehicle (e.g., a car, truck, tank, and the tracks 136 and 137 are substantially parallel), while in another embodiment the tracks 136 and 137 can be generated by two separate vehicles (e.g., two bicycles, two motor-bicycles, a combination of a bicycle and a motor-bicycle, etc., wherein the tracks 136 and 137 may be respectively parallel to each other, or not).

For each pass of the aircraft 110 over the scene 120, the radar system 130 can generate a respective set of data. For example, the radar system 130 generates a first set of data 140 for a first pass over the scene 120, the radar system 130 generates a second set of data 142 for a second pass over the scene 120, the radar system 130 generates an $n^{th}$ set of data 144 for an $n^{th}$ pass over the scene, etc., where n is a positive integer. In an example, the passes over the scene 120 can be conducted with relatively similar geometry relative to the scene 120. The sets of data 140, 142, and 144 can be in any suitable format, such as Ground-Based SAR Application Testbed File Format (GFF).

The system 100 further comprises a computing device 145 that is in direct or indirect communication with the radar system 130. For example, the computing device 145 can be co-located with the radar system 130 on the aircraft 110. In another example, the computing device 145 can be located at a ground station and can be in network communication with the radar system 130. In yet another example, the computing device 145 can be in indirect communication with the radar system 130. In such a case, the radar system 130 can have computer-readable storage co-located therewith for retaining the sets of data 140-144, and such data can be transferred to the computing device 145 through any suitable communications medium (e.g., wired or wirelined). Moreover, the computing device 145 can be a distributed system, wherein some functionality described as being performed by the computing device 145 may occur on the aircraft 110, while other functionality may occur at a base station or processing facility.

The computing device 145 comprises a data store 150 which can retain the sets of data 140, 142, 144. The computing device 145 additionally includes a processor 152 and memory 154, where the memory 154 comprises components that are executed by the processor 152. While the memory 154 is shown as including several components, it is to be understood that FIG. 1 illustrates an exemplary embodiment. In other embodiments, rather than being implemented in memory, the components can be integrated circuits that are configured to perform specified functionality.

In the exemplary system 100 shown in FIG. 1, an image processor component 160 is included in the memory 154, wherein the image processor component 160 is configured to generate SAR images based upon data generated by the radar system 130, wherein the SAR images can be complex-valued SAR images. With more particularity, the image processor component 160 is configured to generate a first SAR image 170 based upon the first set of data 140 and a second SAR image 172 based upon the second set of data 142. Accordingly, the first SAR image 170 depicts the scene 120 for the first pass over the scene 120, and the second SAR image 172 depicts the scene 120 for the second pass over the scene 120. As mentioned, in an example scenario, the first SAR image 170 does not contain any tracks while the second SAR image 172 includes the tracks 136 and 137. In an embodiment, the image processor component 160 can be configured to generate the first SAR image 170 and the second SAR image 172 such that each image comprises phase data and magnitude data.

Figure 2:
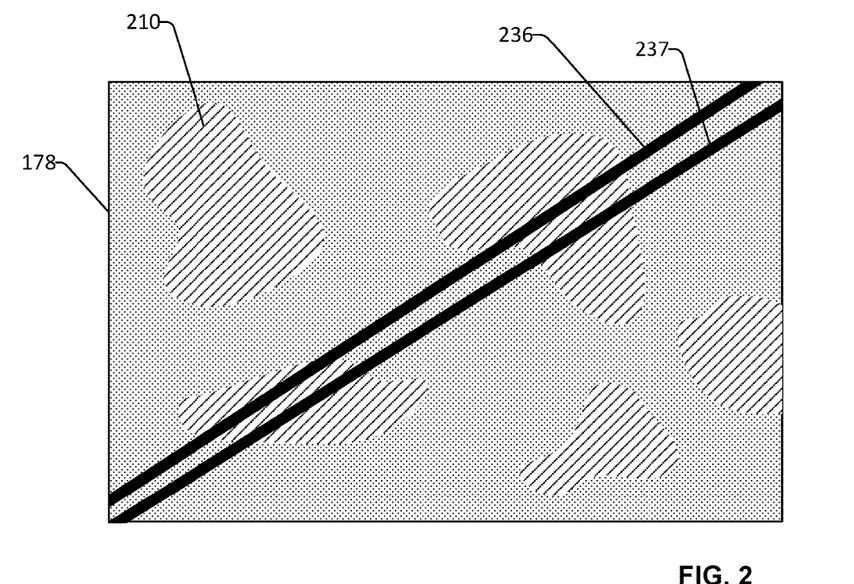
FIG. 2 illustrates CCD image, according to an embodiment.

A registration component 175 is utilized to co-register the first SAR image 170 and the second SAR image 172 to form a CCD image 178, wherein the CCD image 178 comprises a plurality of pixels. Accordingly, a location of a pixel in the first SAR image 170 corresponds to the same pixel and location in the second SAR image 172, and further to the same pixel and location in the CCD image 178, hence the same pixel location in each image corresponds to a common target location in the scene 120. Turning briefly to FIG. 2, the CCD image 178 comprises pixels indicating the pair of tracks 136 and 137, and further areas of scene background 210. Owing to various changes in conditions that can occur between the gathering of the first set of data 140 and the second set of data 142 (e.g., weather effects such as wind, rain, plant growth/disturbance, etc.) the pixels in the scene background 210 may be dark owing to temporal decorrelation. The temporally decorrelated pixels in the scene background 210 can complicate the identification of pixels associated with the tracks 136 and 137 in the CCD image 178.

Again, reference is made to FIG. 1. The memory 154 can further include a track detection component 180 that is configured to identify the presence of the tracks 136 and 137 in the CCD image 178. The track detection component 180 further comprises various sub-components: a Radon transform component 182 which is configured to apply a Radon transform operation to the CCD image 178, a conditional field component 184 to label pixels in the CCD image 178 as being or not being possibly associated with the tracks 136 and 137, and an identification component 186 configured to identify any tracks (e.g., tracks 136 and 137) in the CCD image 178. Operation of the Radon transform component 182, the conditional field component 184, and the identification component 186, will be respectively further described herein.

The computing device 145 can further include a display device 190 which can be utilized to present any of the images/products generated (e.g., per FIGS. 2-5) during detection of a vehicle track(s) in the scene 120. In an embodiment, an indication 195 can be applied to the CCD image 178 (e.g., by the identification component 186) to indicate presence of the vehicle tracks in the CCD image 178, wherein the display device 190 can present the CCD image 178 with the vehicle tracks (e.g., tracks 136 and 137) indicated thereon. Further, information included in the indication 195 can be applied to any other image (e.g., the second SAR image) 172 to indicate presence of the vehicle tracks therein.

The track detection component 180 (and the included components 182, 184, and 186) function based upon framing detection of vehicle tracks as a binary labeling problem on the CCD image 178, wherein each image pixel in the CCD image 178 is classified as belonging to a vehicle track, or not. Pixel labels applied to CCD image 178 are modelled as a binary conditional random field, which leverages labels applied to neighboring pixels as well as observation statistics in the labeling task. Given a total set of N image pixels I in the CCD image 178, image labeling of y is sought such that, per Eqn. 1:

$$y = \operatorname*{argmin}_{y_1,\ldots,y_N}\left\{\sum_{n=1}^{N} U_n(y_n) + \sum_{(m,n)\in I} P_{m,n}(y_m, y_n)\right\} \quad \text{Eqn. 1}$$

where $y_n \in \{1,0\}$ is the class assignment of a pixel n, $U_n(y_n)$ is the unary cost associated with assigning label $y_n$ to the observed (feature) value at pixel n, and $P_{m,n}(m,n)$ is the pairwise cost associated with labeling neighboring pixels m and n as $y_m$ and $y_n$, respectively, wherein pixel m is adjacent to pixel n. In general, the pairwise constraint indicates that adjacent pixels $y_m$ and $y_n$ have the same label, but this constraint can be broken if the unary cost of $y_m$ and $y_n$ being the same values is too high and the cost would be lower if they had different labels. A tradeoff may occur between the unary and pairwise costs: the pairwise cost encourages adjacent pixels to have the same labels (i.e., both pixels labeled 1 or labeled 0), while the unary cost enforces labels that best fit the data in a CCD image. In cases where the unary cost of assigning two adjacent pixels with the same labels exceeds the pairwise cost of assigning differing labels, the overall cost of label assignment is lowered by assigning labels that best explain the CCD data and allowing adjacent labels to differ. As further described, in an embodiment, neighboring pixels can be determined using a 4-neighbor system (although it is to be appreciated that any number of neighboring pixels can be utilized, and further, that any suitable method for labelling neighboring pixels can also be utilized).

The Radon transform component 182 can apply a Radon transform (RT) to a window centered on each pixel in the CCD image 178 to generate an RT image, and can further obtain a radial derivative (RDRT) for each pixel in the RT image to generate a RDRT image. The Radon transform (RT) of a continuous 2D image f(x, y) is given per Eqn. 2:

$$R(r,\theta)=\int f(t\sin\theta+r\cos\theta,-t\cos\theta+r\sin\theta)dt \qquad \text{Eqn. 2}$$

At $(r, \theta) \in R^2$, the RT process takes the value of a line integral along the line in $R^2$ such that the closest point of the line to the origin can be represented in polar coordinates as $(r, \theta)$. In an embodiment, given a CCD image 178 for labeling, the unary cost for a pixel in the CCD image 178 can be based upon the radial (along r) derivative of a local Radon Transform (RDRT) centered at that pixel, wherein the RDRT image/technique can be effective in distinguishing tracks from clutter in CCD imagery.

FIGS. 2-5 illustrate the benefit of utilizing RDRT values, rather than RT values, for distinguishing tracks from background clutter in the CCD image 178. FIG. 2 presents the CCD image 178 that contains large areas of contiguous clutter 210 in addition to bands of pixel tracks 236 and 237 which correspond to the tracks 136 and 137 in the scene 120.

Figure 3:
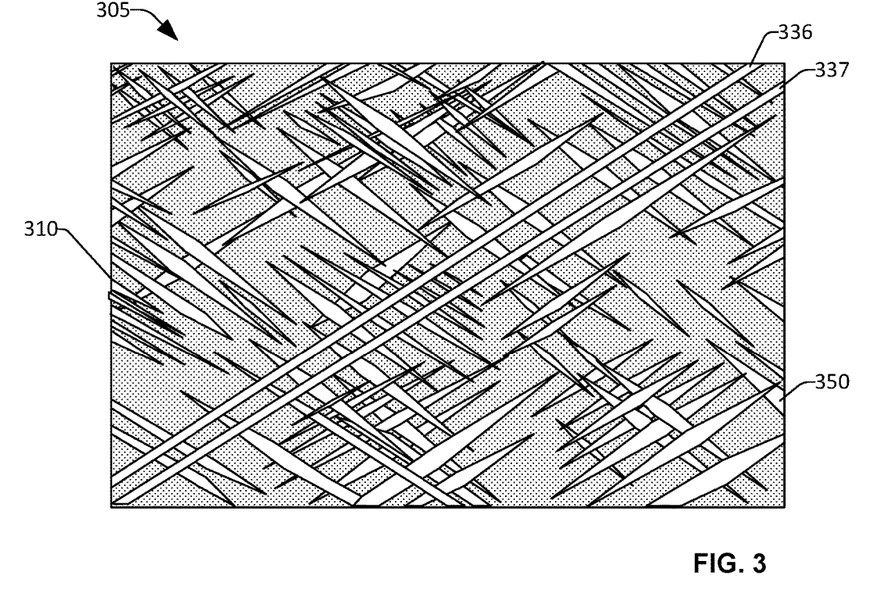
FIG. 3 illustrates a Radon transform image, according to an embodiment.
Figure 6:
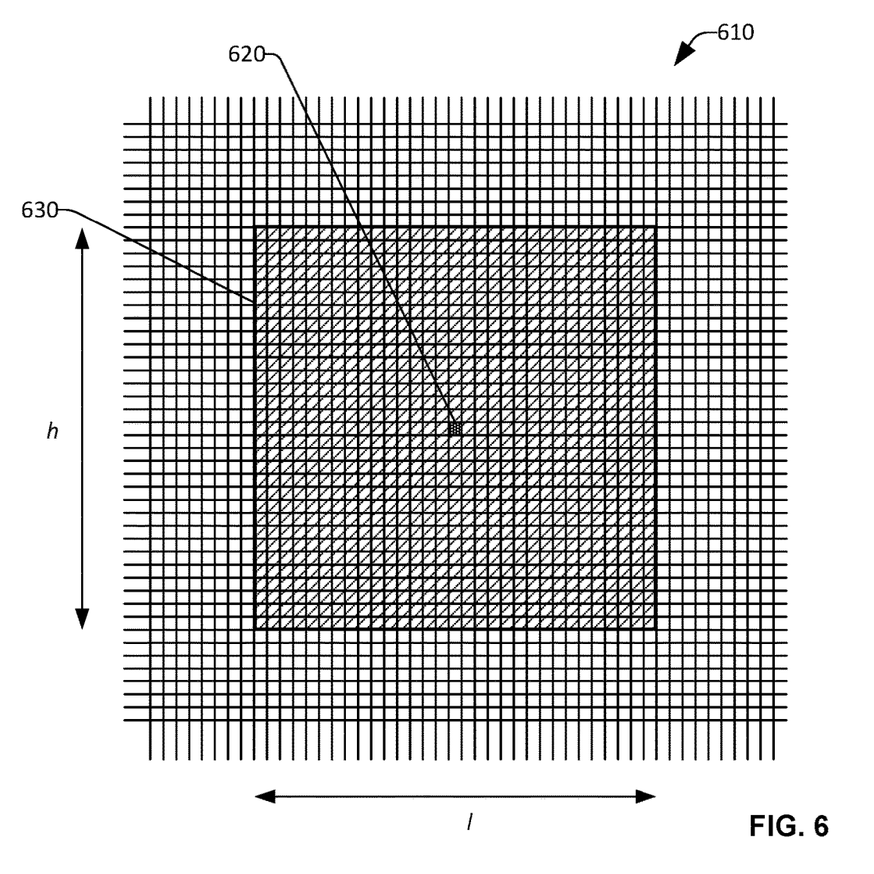
FIG. 6 presents a schematic of a windowing operation being performed on a pixel, according to an embodiment, according to an embodiment.

FIG. 3 is a schematic representation 305 of an RT image 310 resulting from computing RT values over a plurality of windows centered on each pixel in the original CCD image 178, and then taking the maximum value from each window, e.g., each pixel in the RT image 310 is the maximum value of a RT computed over a window centered at the respective pixel of interest. The window can be applied by the Radon transform component 182. As shown, pixels in regions 336 and 337 (e.g., corresponding to tracks 136 and 137 in the scene 120, and the tracks 236 and 237 in the CCD image 178) are potentially lost in the RT clutter 350 resulting from the RT values derived from the contiguous clutter 210 in the CCD image 178. Turning briefly to FIG. 6, an image 610 (e.g., any of a CCD image 178, a RT image 310, etc.) is illustrated comprising a plurality of pixels. A pixel 620 is indicated, having a window 630 located thereon, wherein the window 630 is dimensioned l-pixels by h-pixels. Various operations (e.g., performed by the Radon transform component 182), as described herein, can analyze one or more values of the pixels covered by the window 630 to determine one or more values (characteristics, parameters) for the pixel 620, wherein, as shown in the example, the window 630 is positioned such that the pixel 620 is centrally located within the window 630.

Figure 4:
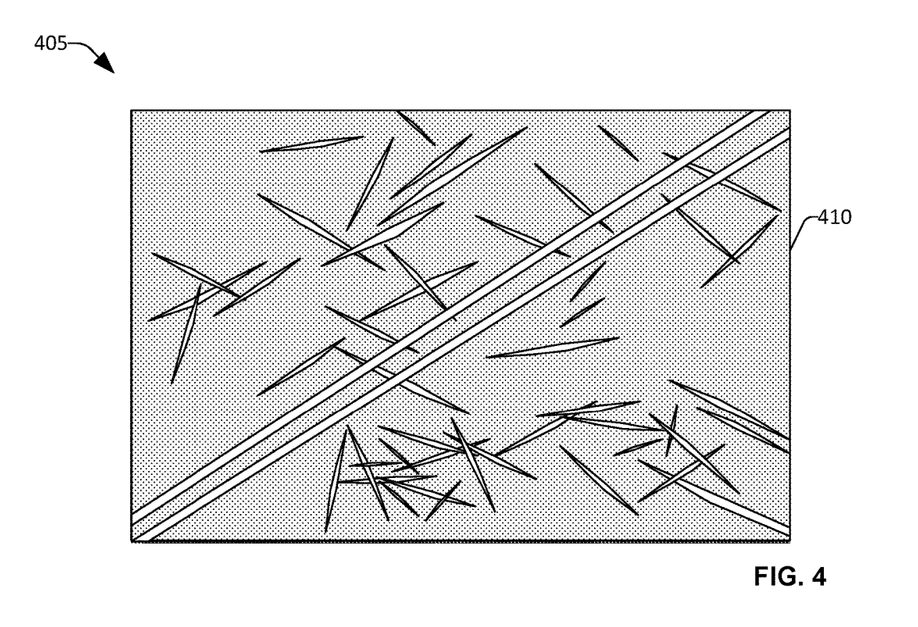
FIG. 4 illustrates an image illustrating signal magnitudes at pixels based upon a radial derivative of a local Radon transform centered on, and for, each respective pixel.

FIG. 4 is a schematic representation 405 of an RDRT image 410 generated based upon maximum values derived from RDRT values obtained for each window 630 applied to pixels included in the RT image 310. With the RT image 310, both the clutter (e.g., clutter 210) and the tracks (e.g., tracks 236 and 237) have RT values with potentially similar magnitudes (e.g., high magnitudes), hence, solely utilizing RT values may not discriminate the tracks 136 and 137 from any clutter generated during the respective capture and/or processing of scene 120. However, it may be easier to distinguish the tracks 236 and 237 from the clutter 210 when rate-of-change of RT values are derived for the tracks 236 and 237, versus the clutter 210. When considering the polar co-ordinates $(r, \theta)$, for tracks 236 and 237 (e.g., narrow tracks created by a motorbike tire), at a given $\theta$, the derivative of a RT value will have a large value only at r that coincides with an edge(s) of the track (e.g., either of tracks 236 and 237). However, rate-of-change of RT values for clutter (e.g., clutter 210) can result in a range of r with similar RT values across a region of clutter, and so values derived from regions of clutter will generally result in low radial derivatives of the RT than the values derived for the tracks 236 and 237, as shown in FIG. 4. Although there may be high value radial derivatives at edges of clutter regions, the magnitude of the radial derivatives at clutter edges are generally lower than that of track edges. Hence, the RDRT process (and the RDRT values obtained therefrom) is able to distinguish the tracks 236 and 237 from background clutter 210, with advantage being taken of this phenomena during a pixel labeling operation, in accordance with Eqn. 1.

It is to be appreciated that while the various embodiments presented herein are described via the use of respective images (e.g., FIGS. 2-5), the various processes (e.g., unary cost determination, pairwise cost, etc.) can be performed based upon arrays of values configured to correspond with respective pixels in the SAR images 170 and 172, and the CCD image 178. Hence, while the RT image 310, the RDRT image 410, etc., are described with operations being performed on corresponding pixels in the respective images, the images can be represented by arrays of values. For example, the RT image 310 can be represented as a two dimensional (2D) array comprising of RT pixel values corresponding to RT values derived from the pixels in the CCD image 178. Similarly, the RDRT operation can be applied to the 2D array of RT pixel values to facilitate formation of a 2D array comprising RDRT pixel values, which can be subsequently utilized to determine the respective unary costs, pairwise costs, etc., for the values in the 2D arrays, and correspondingly, the pixels in the CCD image 178.

The unary cost $U_n(y_n)$ at pixel $n \in 1, \ldots, N$ takes the form, per Eqn. 3:

$$U_n(y_n)=-\log(Pr(x_n|y_n)) \qquad \text{Eqn. 3}$$

where $x_n$ is the maximum RDRT value determined over a window centered on pixel n (e.g., window 630 located over pixel 620, per FIG. 6). The probabilities $Pr(x_n|y_n)$ can be determined based upon logistic regression applied to previously obtained ground truth images which contain one or more tracks.

As mentioned, in an embodiment, the local RT values are computed over windows (e.g., a 32 pixel by 32 pixel window, a window having dimensions generated based upon $2^n$, etc.) using a sliding window method. In an embodiment, if an image (e.g., CCD image 178) contains N pixels, then RT values are computed over N windows, one for each pixel, where each RT window is centered on one of the image pixels. Hence, when utilizing a 32 pixel×32 pixel window, any two adjacent windows will have 31 rows or columns of pixel overlap. With regard to the window 630, a particular window size can be selected based upon a tradeoff between separation in value distributions between the track pixel RDRT values and non-track pixel RDRT values, and computation time (however it is to be appreciated that any suitable window size can be utilized).

In an embodiment, to obtain valid RT values at edge pixels of the CCD image 178, the CCD image 178 can be padded by replicating edges. After computing an RT window for each image pixel (e.g., centered on each image pixel), the numerical gradient of the local RTs along the r-dimension are determined. To obtain a single RDRT value at each pixel for input to the unary function, the maximum magnitude of the RDRT in each window is identified (hence, N maximum RDRT values are obtained, one for each pixel). The RDRT value determined for each pixel in the CCD image 178 form the respective values $x_n$ in Eqn. 3. Optimal labeling for y can be obtained via a graph cut technique, wherein pixels determined to correlate to a track in the RDRT image 410 (and the CCD image 178) can be identified (specified) as being track pixels and hence form a subset of pixels in the set of total pixels forming the RDRT image 410

Figure 7:
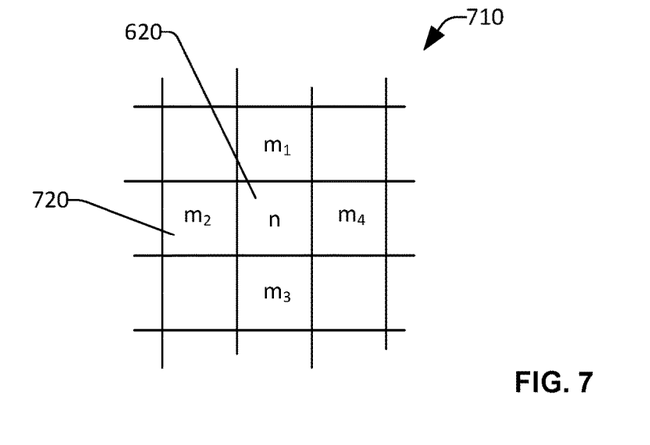
FIG. 7 presents a schematic of a pairwise cost being performed with a neighboring pixel process, according to an embodiment.

In an embodiment, the submodular pairwise cost in Eqn. 1 is selected, per Eqn. 4, as:

$$P_{m,n}(y_m, y_n) = \begin{cases} 1 & y_m \neq y_n \\ 0 & y_m = y_n \end{cases} \quad \text{Eqn. 4}$$

for neighboring pixels m, n. Turning briefly to FIG. 7, a neighboring pixel determination operation is presented in schematic 710. Schematic 710 illustrates a central pixel 620 surrounded by a plurality of pixels, wherein a 4-neighboring pixel operation is being performed on the pixels 720 located adjacent to the pixel 620, e.g., pixels $m_1$ (top), $m_2$ (left), $m_3$ (bottom), and $m_4$ (right).

Figure 5:
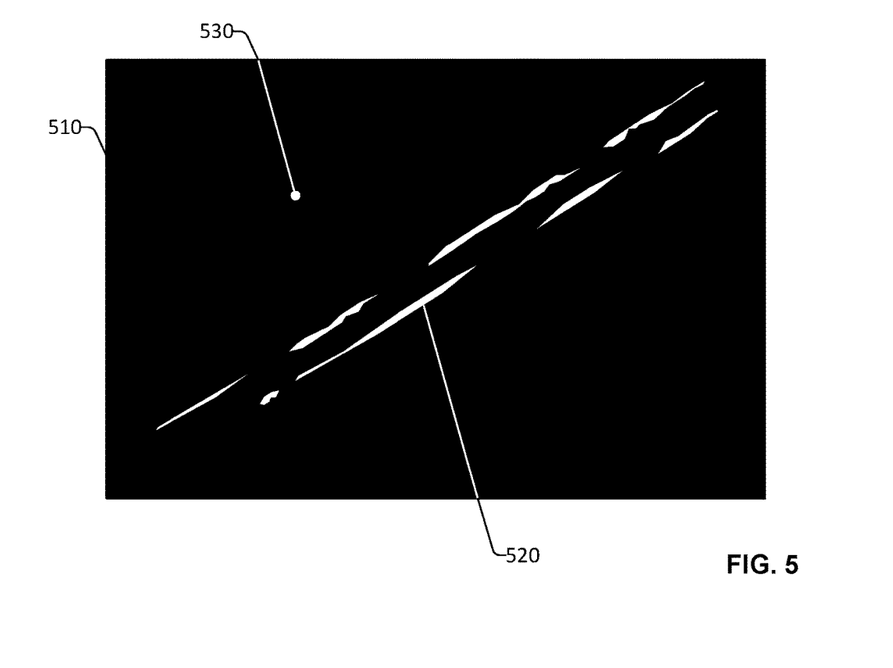
FIG. 5 illustrates an image where respective pixels have been labelled track pixels and not track pixels, according to an embodiment.

FIG. 5 illustrates a labelled image 510, e.g., based upon the CCD image 178 and the tracks 136 and 137 represented therein. The various pixels included in the image 510 have been labelled based in part upon the maximum RDRT values respectively determined for each respective pixel (as previously described), and the resulting conditional random field labeling applied thereto. As shown, based upon one or more of the operations presented herein, the track pixels 520 are readily discerned from the background (clutter) pixels 530.

In an embodiment, due to a high gradient rate-of-change of RT values that may occur at a boundary between isolated clutter or a building, any small connected components of track-labeled pixels can be re-labelled as non-track pixels. A suitable threshold for this re-labeling can be computed for each image from the size distribution for the connected components in the image. In images containing buildings but no track, the threshold may not remove all of the small components due to the component size distribution.

Figure 8:
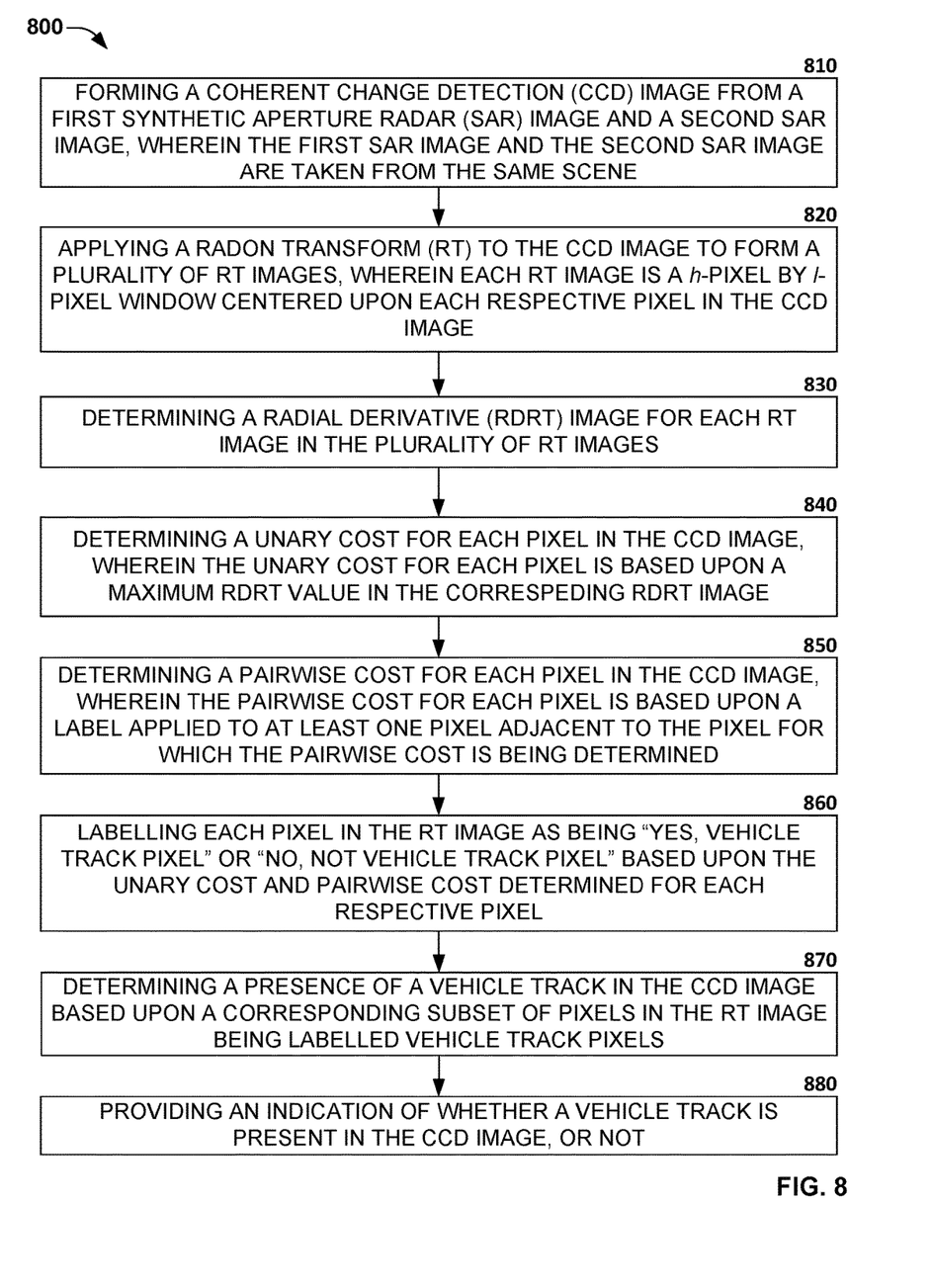
FIG. 8 is a flow diagram illustrating an exemplary methodology for detecting a vehicle track.

FIG. 8 illustrates an exemplary methodology relating to detecting a vehicle track(s) in SAR imaging. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement the methodology described herein.

At 810, a CCD image is formed from a pair of SAR images (e.g., by an image processing component), wherein the first SAR image is a first capture of a scene and the second SAR image is a subsequent, second capture of a scene. It is desired to detect whether any tracks are present in either scene. Any suitable technique can be utilized to form the CCD image, e.g., SAR image registration, the SAR images are SAR magnitude images, the SAR images and/or the CCD image can undergo smoothing to minimize SAR speckle, etc.

At 820, a windowed RT operation can be applied over the CCD image to form a plurality of RT images, wherein each RT image is respectively centered at each pixel in the CCD image, and the RT operation can be performed by a track detection component. The window can have a size h-pixels× l-pixels. In an embodiment, the size of the window used in the RT operation constrains the length of a track to a track length that traverses from a first side (e.g., left hand side) of the window to a second side (e.g., right hand side) of the window when the window is centered on each respective pixel. An RT image is formed for each pixel window, effectively forming mini RT images from the CCD image, wherein each RT image of a first pixel overlaps an RT image of a neighboring pixel in the CCD image.

At 830, an RDRT image window can be determined from the corresponding RT image window (e.g., by the track detection component) for each pixel in the RT image to facilitate formation of a RDRT image. A first pixel in the RDRT image for a given window relates to a location and magnitude of the corresponding first pixel in the RT image for that window, and further, the corresponding first pixel in the CCD image window. Similarly, a second pixel in the RDRT image for a given window relates to a location and magnitude of the corresponding second pixel in the RT image for that window, and further, the corresponding second pixel in the CCD image window.

At 840, a unary cost for each pixel in the RDRT image can be determined (e.g., by the track detection component). The unary cost is determined from the RDRT image window centered around each pixel in the original CCD image. The unary cost for each pixel is based upon a maximum RDRT value determined for the pixels within the RDRT image window respectively positioned around the pixel of interest.

At 850, a pairwise cost is determined (e.g., by the track detection component) for each pixel in the original CCD image. The pairwise cost of a pixel is based upon a label applied to at least one pixel that is located adjacent to the pixel for which the pairwise cost is being determined.

At 860, each pixel in the RT image is labelled with a binary value (e.g., by the track detection component), the binary value being "Yes, the pixel is determined to represent a portion of a vehicle track", or "No, the pixel is determined to not represent a portion of a vehicle track". The binary label applied to each respective pixel is based upon a combination of the unary cost and pairwise cost determined for the respective pixel.

At 870, the presence of a vehicle track is determined (e.g., by the track detection component) in the RT image based upon identifying a subset of pixels in the RT image all being labelled "Yes, the pixel is determined to represent a portion of a vehicle track".

At 880, an indication is generated (e.g., by the track detection component), wherein the indication identifies whether a vehicle track is present in the CCD image, or not. The indication can be based upon corresponding pixels that have been labelled "vehicle track" pixels in the RT image.

Figure 9:
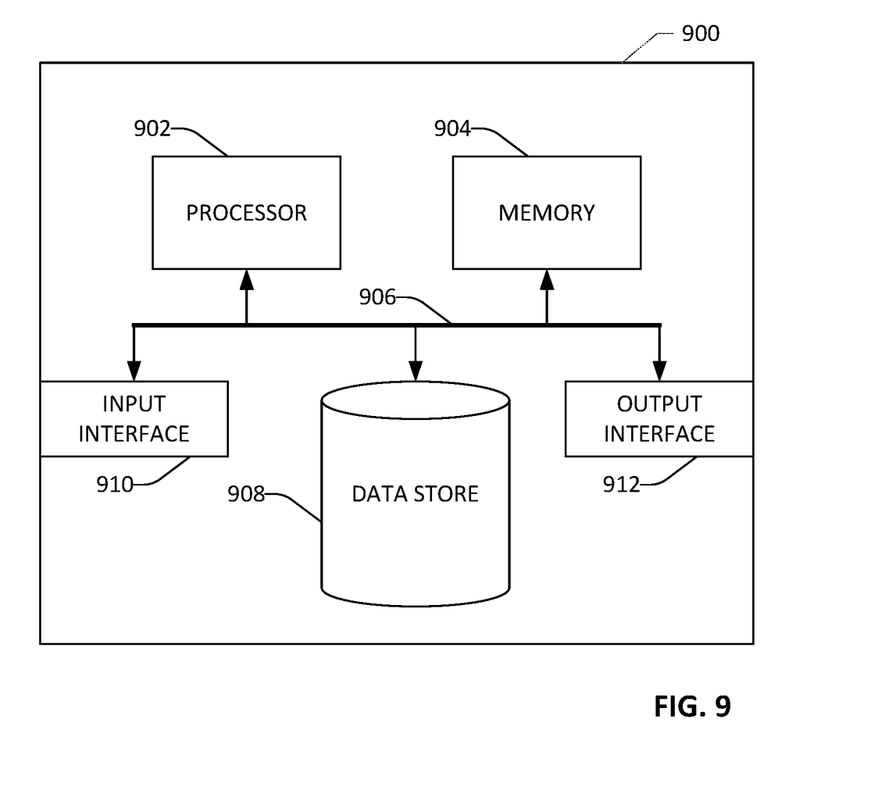
FIG. 9 illustrates an exemplary computing device.

Referring now to FIG. 9, a high-level illustration of an exemplary computing device 900 that can be used in accordance with the systems and methodologies disclosed herein is illustrated. For instance, the computing device 900 may be utilized to identify whether a vehicle track is in a radar image of a scene. For example, computing device 900 can operate as the radar system 130, the computing device 85, etc. The computing device 900 includes at least one processor 902 that executes instructions that are stored in a memory 904. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store operating parameters, required operating parameters, and so forth.

The computing device 900 additionally includes a data store 908 that is accessible by the processor 902 by way of the system bus 906. The data store 908 may include executable instructions, operating parameters, required operating parameters, etc. The computing device 900 also includes an input interface 910 that allows external devices to communicate with the computing device 900. For instance, the input interface 910 may be used to receive instructions from an external computer device, from a user, etc. The computing device 900 also includes an output interface 912 that interfaces the computing device 900 with one or more external devices. For example, the computing device 900 may display text, images, etc., by way of the output interface 912.

Additionally, while illustrated as a single system, it is to be understood that the computing device 900 may be a distributed system. Thus, for instance, several devices may be in communication by way of a network connection and may collectively perform tasks described as being performed by the computing device 900.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. The terms "component" and "system" are also intended to encompass hardware configured to cause certain functionality to be performed, where such hardware can include, but is not limited to including, Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above structures or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing system comprising:
   at least one processor; and
   memory that comprises instructions that, when executed by the at least one processor, cause the at least one processor to perform acts comprising:
   determining a radial derivative (RDRT) value for each pixel in a plurality of pixels included in a Radon transform (RT) representation, wherein the RT representation is formed from a coherent change detection (CCD) image, and wherein respective pixel values included in the RT representation are based upon magnitude values for corresponding pixels in the CCD image;
   evaluating a first unary cost of labeling a first pixel in the plurality of pixels as being representative of a vehicle track, wherein the first unary cost is based upon a first RDRT value associated with the first pixel;
   evaluating a second unary cost of labeling the first pixel as being not representative of a vehicle track, wherein the second unary cost of labeling the first pixel is based upon the first RDRT value associated with the first pixel;
   labeling the first pixel in the plurality of pixels as being representative of the vehicle track based upon the first unary cost and the second unary cost; and
   outputting an indication that a vehicle track exists in the CCD image, based upon the first pixel in the RT representation being labeled as being representative of a vehicle track.

2. The computing system of claim 1, wherein the labeling of the first pixel in the plurality of pixels is based further upon a pairwise cost, wherein the pairwise cost of labeling the first pixel is based upon a label of an adjacent pixel, wherein the adjacent pixel is labelled as one of being representative of a vehicle track or not being representative of a vehicle track.

3. The computing system of claim 2, the acts further comprising determining, for each pixel in the plurality of pixels, the unary cost of labeling the pixel as being representative of a vehicle track based upon:
   applying a window around each respective pixel, wherein the window has a size of l-pixels by h-pixels, wherein l and h are integers;
   determining a RDRT value across the window; and
   applying the determined RDRT value to the respective pixel around which the window is centered.

4. The computing system of claim 3, wherein the determined RDRT value is the maximum RDRT value determined for all the pixels included in the window.

5. The computing system of claim 3, wherein the window size is 32 pixels by 32 pixels.

6. The computing system of claim 2, the acts further comprising determining a pairwise cost for each pixel in the plurality of pixels by:

determining one or more pairwise values for a pixel based upon a label applied to each pixel located adjacent to the respective pixel; and determining the pairwise cost for the respective pixel based upon the identified one or more pairwise values.

7. The computing system of claim 6, wherein the adjacent pixels comprise of at least one of a second pixel located adjacent and to the right of the respective pixel, a third pixel located adjacent and to the left of the respective pixel, a fourth pixel located adjacent and below the respective pixel, or a fifth pixel located adjacent and above the respective pixel.

8. The computing system of claim 1, further comprising a display device, wherein outputting the indication that the vehicle track exists in the CCD image comprises displaying the CCD image with the vehicle track indicated thereon on the display device.

9. A computer-executable method for identifying a vehicle track in a radar image, comprising:

determining a radial derivative (RDRT) value for each pixel in a plurality of pixels included in a Radon transform (RT) representation, wherein the RT representation is formed from a coherent change detection (CCD) image, and wherein respective pixel values included in the RT representation are based upon magnitude values for corresponding pixels in the CCD image;

labeling a first pixel in the plurality of pixels as being representative of a vehicle track based upon a first unary cost of labeling the first pixel as being representative of the vehicle track and a second unary cost of labeling the first pixel as not being representative of the vehicle track, wherein the first unary cost and the second unary cost are based upon a first RDRT value associated with the first pixel; and outputting an indication that a vehicle track exists in the CCD image, based upon the first pixel in the RT representation being labeled as being representative of a vehicle track.

10. The method of claim 9, wherein the labeling of the first pixel in the plurality of pixels is based further upon a pairwise cost of labeling the first pixel as being representative of the vehicle track, the pairwise cost based upon a label assigned to a second pixel that is adjacent to the first pixel, wherein the label assigned to the second pixel is indicative of whether the second pixel is representative of a vehicle track.

11. The method of claim 9, wherein the first RDRT value is the maximum RDRT value determined for all the pixels included in a window of pixels centered around the first pixel.

12. The method of claim 11, wherein a size of the window of pixels is 32 pixels by 32 pixels.

13. The method of claim 10, wherein the pairwise cost of labeling the first pixel as being representative of the vehicle track is based upon labels assigned to a plurality of pixels that are adjacent to the first pixel, the second pixel included in the plurality of pixels that are adjacent to the first pixel.

14. The method of claim 13, wherein the plurality of adjacent pixels further comprise at least one of a third pixel located adjacent and to the right of the first pixel, a third pixel located adjacent and to the left of the first pixel, a fourth pixel located adjacent and below the first pixel, or a fifth pixel located adjacent and above the first pixel.

15. The method of claim 9, wherein outputting the indication that the vehicle track exists in the CCD image comprises displaying the CCD image with the track indicated thereon.

16. A computer-readable storage medium comprising instructions that, when executed by a processor, cause the processor to perform acts comprising:

determining a radial derivative (RDRT) value for each pixel in a plurality of pixels included in a Radon transform (RT) image, wherein the RT image is formed from a coherent change detection (CCD) image depicting a scene;

labeling a first pixel in the plurality of pixels as being representative of a vehicle track, the labelling is based upon a combination of a unary cost of labeling the first pixel based upon the RDRT for the first pixel and a pairwise cost of labeling the first pixel based upon a label of a pixel that is adjacent to the first pixel, wherein the pixel that is adjacent to the first pixel is labelled as one of being representative of a vehicle track or not being representative of a vehicle track; and outputting an indication that a vehicle track exists in the CCD image based upon the first pixel being labeled as being representative of a vehicle track.

17. The computer-readable storage medium of claim 16, wherein outputting the indication comprises displaying the CCD image with the first pixel identified thereon.

18. The computing system of claim 1, wherein evaluating the first unary cost is based upon a probability of the first pixel being associated with the first RDRT value given the first pixel being labeled as representative of the vehicle track.

* * * * *

UNITED STATES PATENT AND TRADEMARK OFFICE
CERTIFICATE OF CORRECTION

PATENT NO.        : 10,467,474 B1
APPLICATION NO.   : 15/207290
DATED             : November 5, 2019
INVENTOR(S)       : Rebecca Malinas, Tu-Thach Quach and Mark W. Koch Page 1 of 1

It is certified that error appears in the above-identified patent and that said Letters Patent is hereby corrected as shown below:

On the Title Page (71) Applicant: please delete "MN" and insert therefore --NM--;

(72) Inventors Line 2: please delete "MN" and insert therefore --NM--;

(72) Inventors Line 3: please delete "MN" and insert therefore --NM--.

Signed and Sealed this
Tenth Day of December, 2019

Andrei Iancu
*Director of the United States Patent and Trademark Office*